(12) United States Patent
Noro

(10) Patent No.: US 9,043,023 B2
(45) Date of Patent: May 26, 2015

(54) ROBOT SYSTEM, AND CONTROL APPARATUS AND METHOD THEREOF

(75) Inventor: Hideo Noro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 595 days.

(21) Appl. No.: 12/972,916

(22) Filed: Dec. 20, 2010

(65) Prior Publication Data

US 2011/0153076 A1  Jun. 23, 2011

(30) Foreign Application Priority Data

Dec. 22, 2009  (JP) .................................. 2009-291238

(51) Int. Cl.
| | |
|---|---|
| B25J 15/00 | (2006.01) |
| B25J 9/00 | (2006.01) |
| B25J 9/16 | (2006.01) |
| B25J 13/02 | (2006.01) |
| B25J 15/10 | (2006.01) |

(52) U.S. Cl.
CPC .............. *B25J 9/1687* (2013.01); *B25J 9/1664* (2013.01); *B25J 15/10* (2013.01); *B25J 9/1676* (2013.01); *B25J 15/00* (2013.01); *G05B 2219/39487* (2013.01); *B25J 9/1612* (2013.01); *B25J 13/02* (2013.01); *B25J 9/1666* (2013.01); *G05B 2219/36504* (2013.01)

(58) Field of Classification Search
CPC ...... B25J 9/1666; B25J 9/1612; B25J 9/1664; B25J 13/02; B25J 13/084; B25J 15/00; B25J 15/10; B25J 9/106; B25J 9/1679; B25J 9/1697; B25J 15/0009; B25J 19/023; B25J 9/1676; G05B 2219/39486; G05B 2219/36404; G05B 2219/36504; G05B 2219/39082

USPC .......... 700/247, 249–251, 255; 901/2, 14, 15, 901/16, 30–33, 35, 36, 41
See application file for complete search history.

(56) References Cited

U.S. PATENT DOCUMENTS 5,727,132 A * 3/1998 Arimatsu et al. ............. 700/259
2004/0162639 A1 * 8/2004 Watanabe et al. ............. 700/259
(Continued)

FOREIGN PATENT DOCUMENTS

| JP | 6-170771 A | 6/1994 |
|---|---|---|
| JP | 2000-71190 A | 3/2000 |

(Continued)

*Primary Examiner* — Jason Holloway
(74) *Attorney, Agent, or Firm* — Canon USA Inc. IP Division

(57) ABSTRACT

A robot system, including an arm capable of controlling a position and orientation of an arm tip portion, a hand, which is attached to the arm tip portion and which includes a grasping mechanism configured to grasp an operation target, capable of controlling a relative position and orientation from the arm tip portion of the grasped operation target, and a position and orientation measurement apparatus configured to perform relative position and orientation measurement from the arm tip portion of the grasped operation target, wherein measurement of the relative position and orientation from the arm tip portion of the operation target is performed after the operation target is grasped by the grasping mechanism, while the arm tip portion is still moving, and correction of the relative position and orientation from the arm tip portion of the hand is performed based on a result of the position and orientation measurement so that the arm tip portion takes a predetermined relative position and orientation from the arm tip portion.

13 Claims, 12 Drawing Sheets

(56) References Cited

U.S. PATENT DOCUMENTS

2004/0186624 A1* 9/2004 Oda et al. ............... 700/245
2009/0171505 A1* 7/2009 Okazaki ............... 700/258
2009/0285664 A1* 11/2009 Kim et al. ............... 414/730
2010/0139437 A1* 6/2010 Ichikawa et al. ............ 74/490.05
2010/0318224 A1* 12/2010 Okuda et al. ............... 700/255
2010/0332032 A1* 12/2010 Moriyama et al. ............ 700/258

FOREIGN PATENT DOCUMENTS

| JP | 2008-161994A A | 7/2008 |
| JP | 2008-269021A A | 11/2008 |
| JP | 2009-50921 A | 3/2009 |

* cited by examiner

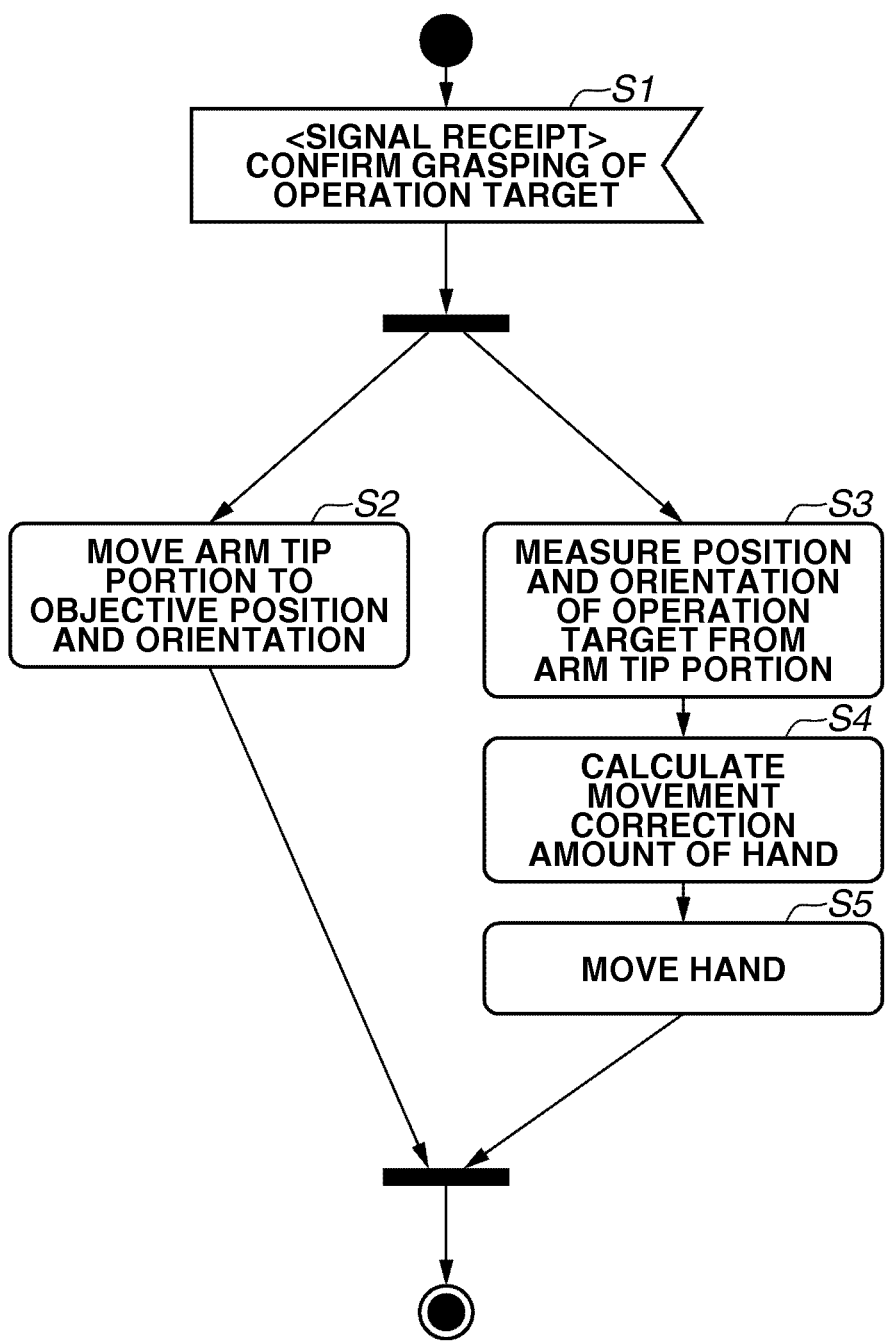

ROBOT SYSTEM, AND CONTROL APPARATUS AND METHOD THEREOF

BACKGROUND OF THE INVENTION

1. Field of the Invention

The present invention relates to a robot system for grasping and moving an operation target, and a control apparatus, method, and program thereof.

2. Description of the Related Art

Industrial robots have been introduced into production sites for various purposes, such as to stably produce high-quality products, and to release people from dangerous operations and operations that cause fatigue.

Conventionally, simple, repetitive tasks have been performed by attaching a hand for grasping an operation target on an arm of the robot, moving the arm along a predetermined course, and making the hand perform a grasping operation. Examples of simple tasks include the conveyance and sorting of operation targets, and the fitting and assembly with other operation targets.

For instance, the conveyance of a part is used as an example. Since the part is placed on a predetermined position on a parts supply pellet, first, the arm is moved to a position where the part can be grasped by the hand. Next, the part is grasped by moving the hand, and the part is then conveyed to a predetermined position on the pellet by again moving the arm. Then, the part is released by operating the hand.

However, unless the operation target (part) is correctly arranged on the parts supply pellet in a predetermined position and orientation, the part will not be completely grasped, which can make it difficult to complete the operation (conveyance). Accordingly, in Japanese Patent Application Laid-Open No. 6-170771, a distance detector is provided on the hand. The part is grasped by measuring the position and orientation of the operation target immediately before it is grasped, and the position and orientation of the grasping member are matched to the position and orientation of the operation target.

However, even when the operation target is grasped while taking such a measure, the position and orientation of the operation target can deviate due to contact between the grasping mechanism of the hand and the operation target.

To improve on this situation, the measurement and correction of the position and orientation of the operation target may be performed after the operation target is grasped. In Japanese Patent Application Laid-Open No. 2009-50921, the operation is executed by, after the operation target is grasped, measuring the position and orientation of the operation target by causing the operation target to hit an object having a known position and orientation, and sequentially moving the robot to an instructed position whose deviation from the original position and orientation has been corrected. Further, in Japanese Patent Application Laid-Open No. 2009-50921, movement of the hand is controlled so as to compensate for a deviation calculated by detecting the deviation from the correct position of the operation target carried by the hand.

However, in Japanese Patent Application Laid-Open No. 2009-50921, there is the problem that cycle time increases when measuring the position and orientation of the grasped operation target, because the operation target is made to hit an object having a known position and orientation.

Further, in Japanese Patent Application Laid-Open No. 2000-71190, the compensation of the positional deviation of the operation target is performed by correcting the objective position and orientation of the hand by only the deviation amount. Usually, a multiaxis control arm-type industrial robot has an arm with a large moment of inertia in order to maintain rigidity, and also a large time constant.

Further, for example, when calculating the route-points using inverse kinematics, usually the largest time constant in a normal system is used for the time constant. Consequently, to complete correction of the position and orientation without increasing the movement time of the arm, the determination of the corrected objective position and orientation has to be completed by a time based on a value of the time constant before the predicted time of the objective is reached. Therefore, to prevent the cycle time from increasing in a system having a large time constant, such as a multiaxis control arm-type industrial robot, there is a need to resolve the problem that the time spent to measure the position and orientation of the grasped operation target and to determine the position and orientation after correction is short.

In addition, in the above-described conventional art, the positional deviation of an operation target is corrected. Therefore, there is the problem that when performing a fitting or assembly operation on another operation target, the positional deviation of another operation target cannot be corrected.

Moreover, the above-described conventional art suffers from the problems that when the positional deviation of the grasped target is large, the target may collide with an obstruction while the arm is being moved, or that the grasping operation may have to be performed again.

SUMMARY OF THE INVENTION

The present invention is directed to performing position and orientation measurement, and position and orientation correction of an operation target grasped by a hand without increasing the cycle time.

According to an aspect of the present invention, a robot system includes an arm capable of controlling a position and orientation of an arm tip portion, a hand, which is attached to the arm tip portion and which includes a grasping mechanism configured to grasp an operation target, capable of controlling a relative position and orientation from the arm tip portion of the operation target grasped by the grasping mechanism, a position and orientation measurement unit configured to perform relative position and orientation measurement from the arm tip portion of the operation target grasped by the hand, and a control unit configured to grasp the operation target with the grasping mechanism, and then perform position and orientation measurement, and position and orientation correction of the grasped operation target while the arm tip portion is still moving, wherein the control unit, for the position and orientation measurement, measures the relative position and orientation from the arm tip portion of the operation target, and for the position and orientation correction, corrects the relative position and orientation from the arm tip portion of the hand so that the operation target takes a predetermined relative position and orientation from the arm tip portion based on a result of the position and orientation measurement.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a flowchart illustrating a control processing flow according to the first exemplary embodiment.

DESCRIPTION OF THE EMBODIMENTS

Various exemplary embodiments, features, and aspects of the invention will be described in detail below with reference to the drawings.

Figure 1A:
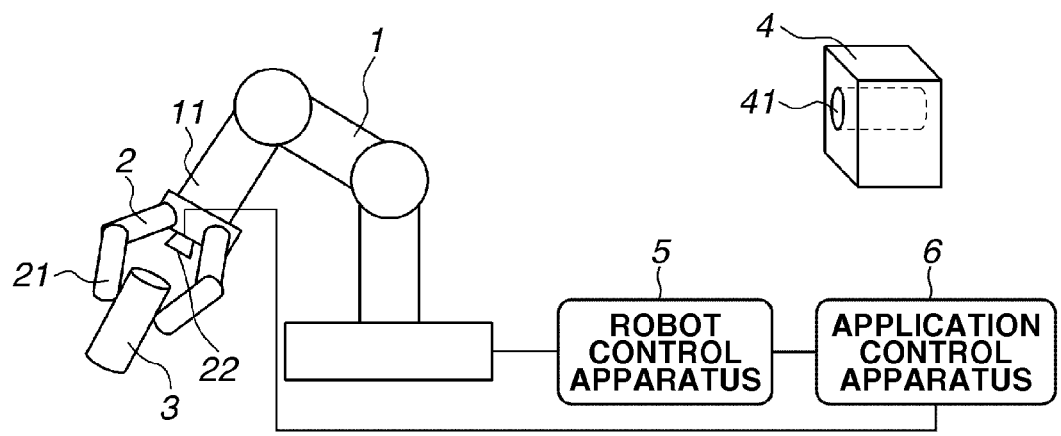
FIGS. 1A, 1B, and 1C illustrate a configuration and operational state of a robot system according to a first exemplary embodiment.

FIG. 1A illustrates a configuration example of a robot system according to a first exemplary embodiment in which the present invention is applied. An arm 1 is an articulated serial-link robot. Each joint is driven by a motor, which enables the position and orientation of an arm tip portion 11 to be controlled.

A hand 2 is attached to the arm tip portion 11. The hand 2 has a grasping member (grasping mechanism) 21, which grasps and releases an operation target 3. Further, the hand 2 includes a control mechanism, such as a rotation mechanism and a multijointed finger mechanism, at a joint corresponding to a wrist, in a range that is sufficient for correction of the position and orientation of the grasped object. This mechanism can be realized even by, for example, a parallel ring mechanism, or a structure that combines an XYZ stage and a pan-tilt-roll triaxial platform.

Although the time constant of the arm 1 is large, the time constant of the hand 2 is comparatively small, and the hand 2 can be controlled in a highly responsive manner.

In addition, the hand 2 has a position and orientation measurement apparatus 22 which performs relative position and orientation measurement from the arm tip portion 11 of the grasped operation target 3. This mechanism can be realized by, for example, a visual sensor that includes a camera and an image processing unit.

The arm 1 and the hand 2 are controlled by a robot control apparatus 5. An application control apparatus 6 operates the arm 1 and the hand 2 by issuing an instruction to the robot control apparatus 5. In addition, the application control apparatus 6 can learn of the position and orientation of the operation target 3 grasped by the grasping member 21 based on an output from the position and orientation measurement apparatus 22. The application for executing the control applying the present invention is mounted and executed in the application control apparatus 6.

In the present exemplary embodiment, an example is illustrated in which the arm 1 is an articulated serial-link robot and the hand 2 is a parallel link mechanism. However, mechanisms to be used are not limited, and other mechanisms may be used.

Figure 1B:
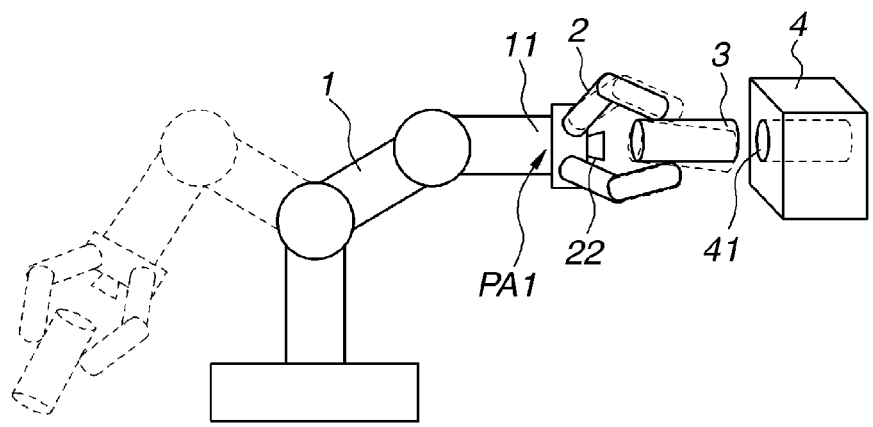
Figure 1C:
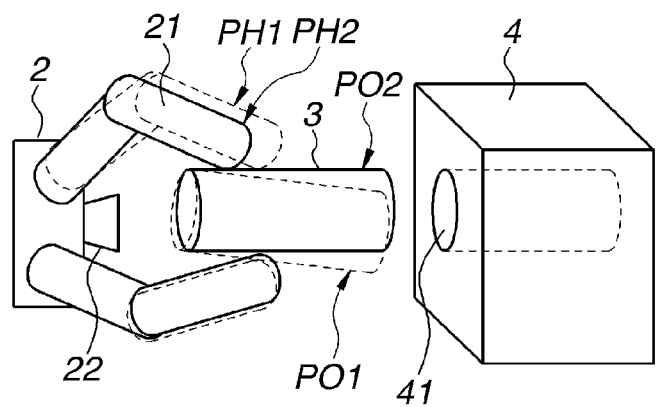

After the operation target 3 is grasped by the grasping member 21, an operation might be performed for fitting the operation target 3 into an aperture 41 of another operation target 4. FIG. 1A illustrates a state immediately after the operation target 3 has been grasped by the grasping member 21. FIG. 1B illustrates a state immediately before the operation target 3 is fitted into the aperture 41 of another operation target 4. In FIG. 1B, the robot control apparatus 5 and the application control apparatus 6 have been omitted from the illustration. Further, FIG. 1C illustrates the positional relationship between the hand 2, the operation target 3, and another operation target 4 immediately before the operation target 3 is fitted into the aperture 41 of another operation target 4.

FIG. 2 is a flowchart illustrating a control processing flow executed by the application control apparatus 6. First, as illustrated in FIG. 1A, in step S1, the application control apparatus 6 confirms that the operation target 3 has been grasped by the grasping member 21. However, immediately after the operation target 3 is grasped, the operation target 3 is still in contact with a parts supply bench. If the operation target 3 is lifted in this state so that it is no longer in contact with the parts supply platform, there is a chance that the position and orientation of the operation target 3 will change slightly. If such a position and orientation is a problem, in addition to step S1, it can also be confirmed that the operation target 3 has been lifted. Further, the strategy employed until the operation target 3 is grasped by the grasping member 21 is beyond the scope of the present invention, and thus a description thereof is omitted here.

Next, as illustrated in FIG. 1B, in step S2, the arm tip portion 11 is moved to an objective position and orientation PA1. The "objective position and orientation PA1" is, when the operation target 3 is grasped at a correct position and orientation PO2 by the grasping member 21, the position and orientation in a robot reference coordinate system of the arm tip portion 11 immediately before the operation target 3 is fitted into the aperture 41 of another operation target 4. The position and orientation PO2 is the relative position and orientation from the arm tip portion 11. This is the same for the below-described position and orientation PO1 of the operation target 3 and the position and orientation PH1 and PH2 of the hand 2.

However, the operation target 3 is not always grasped by the grasping member 21 at the correct position and orientation PO2. As illustrated by the dashed line in FIG. 1C, when the operation target 3 is grasped at the position and orientation PO1, if the fitting operation is continued in that state, the operation target 3 will collide with another operation target 4.

Therefore, in steps S3 to S5, the position and orientation of the operation target 3 are measured, and corrected to a predetermined relative position and orientation PO2 from the position and orientation PO1. The position and orientation measurement and the position and orientation correction performed in steps S3 to S5 are executed while the arm tip portion 11 is still moving in step S2. First, in step S3, the relative position and orientation PO1 from the arm tip portion 11 of the operation target 3 is measured.

Next, in step S4, based on the current position and orientation PH1 of the hand 2 and the position and orientation PO1 of the operation target 3 (results of the position and orientation measurement), the objective position and orientation PH2 of the hand 2 when the operation target 3 is moved to the correct position and orientation PO2 are calculated.

A case will now be considered in which a coordinate system CO fixed above the operation target 3 is converted into another coordinate system. If the coordinate conversion matrices corresponding to the position and orientation PH1, PH2, PO1, and PO2 are respectively represented by MCH1, MCH2, MVH1, and MVH2, using the coordinate conversion matrix MOH between CO and the coordinate system fixed above hand 2, the conversion is performed as follows. However, in this case it is assumed that the position and orientation relationship between the two systems is constant while the operation target 3 is grasped by the grasping member 21.

$$MVH1 \cdot CO = MHC1 \cdot MOH \cdot CO$$

$$MVH2 \cdot CO = MHC2 \cdot MOH \cdot CO$$

Therefore, $$MHC2 = MVH2 \cdot (MVH1 \cdot MHC1-1)-1$$

If each conversion matrix is divided into a translation component (Tx, Ty, and Tz) in the XYZ coordinate system and a rotation component about each axis (Rx, Ry, and Rz), a homogeneous coordinate can be represented by multiplication of the following matrices. Although the matrix multiplication order depends on the position and orientation correction mechanism, in the present case, the translation is performed after rotating in the Z axis, Y axis, and X axis.

$$\begin{pmatrix} 1 & 0 & 0 & Tx \\ 0 & 1 & 0 & Ty \\ 0 & 0 & 1 & Tz \\ 0 & 0 & 0 & 1 \end{pmatrix} \begin{pmatrix} 1 & 0 & 0 & 0 \\ 0 & \cos Rx & -\sin Rx & 0 \\ 0 & \sin Rx & \cos Rx & 0 \\ 0 & 0 & 0 & 1 \end{pmatrix} \quad (1)$$

$$\begin{pmatrix} \cos Ry & 0 & \sin Ry & 0 \\ 0 & 1 & 0 & 0 \\ -\sin Ry & 0 & \cos Ry & 0 \\ 0 & 0 & 0 & 1 \end{pmatrix} \begin{pmatrix} \cos Rz & -\sin Rz & 0 & 0 \\ \sin Rz & \cos Rz & 0 & 0 \\ 0 & 0 & 0 & 0 \\ 0 & 0 & 0 & 1 \end{pmatrix}$$

In step S5, the hand 2 is moved from the current position and orientation PH1 to the objective position and orientation PH2.

If the above-described control method is used, no matter what the position and orientation of the operation target 3 grasped by the grasping member 21, there is no effect on the movement operation of the arm tip portion 11. Therefore, when completing the position and orientation correction of the operation target 3 so that the arm tip portion 11 moves to the objective position and orientation PA1, the fitting operation can be performed without increasing the cycle time.

Further, since the position and orientation correction is performed after the operation target 3 is grasped by the grasping member 21, the pre-grasping position and orientation of the operation target 3 only need be known to the extent that the operation target 3 can be grasped. Therefore, when using a grasping strategy in which the position and orientation is measured before grasping, high-accuracy position and orientation measurement is unnecessary.

Thus, the relative position and orientation measurement from the arm tip portion of the operation target and the correction of the relative position and orientation from the arm tip portion of the arm are performed while the arm tip portion is still moving. Consequently, the position and orientation measurement and the position and orientation correction of the operation target grasped by the hand can be performed without increasing cycle time. Further, there is the advantage that for a system having a large time constant, the time spent to measure the position and orientation of the grasped operation target 3 and to determine the position and orientation after correction can be lengthened. In addition, there is also the advantage that the position and orientation of the operation target 3 does not have to be correctly measured before grasping.

Figure 3:
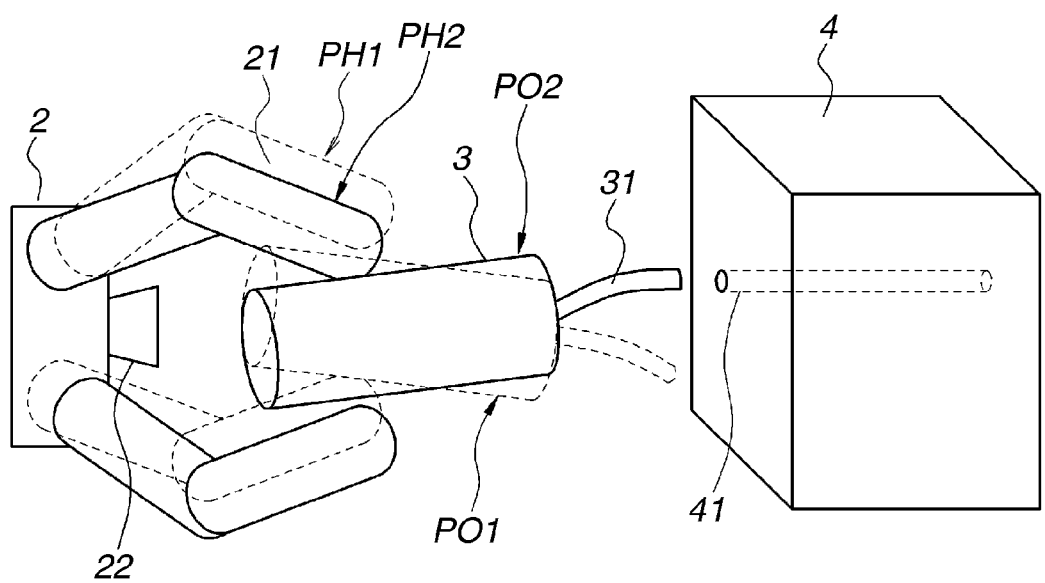
FIG. 3 illustrates an operational state of a robot system according to a second exemplary embodiment.

The operation target 3 does not have to be a rigid body. For example, as illustrated in FIG. 3, the tip of the operation target 3 may be a flexible protrusion 31. An example will now be described of an operation in which this flexible protrusion 31 is inserted into the aperture 41 of another operation target 4.

Figure 4:
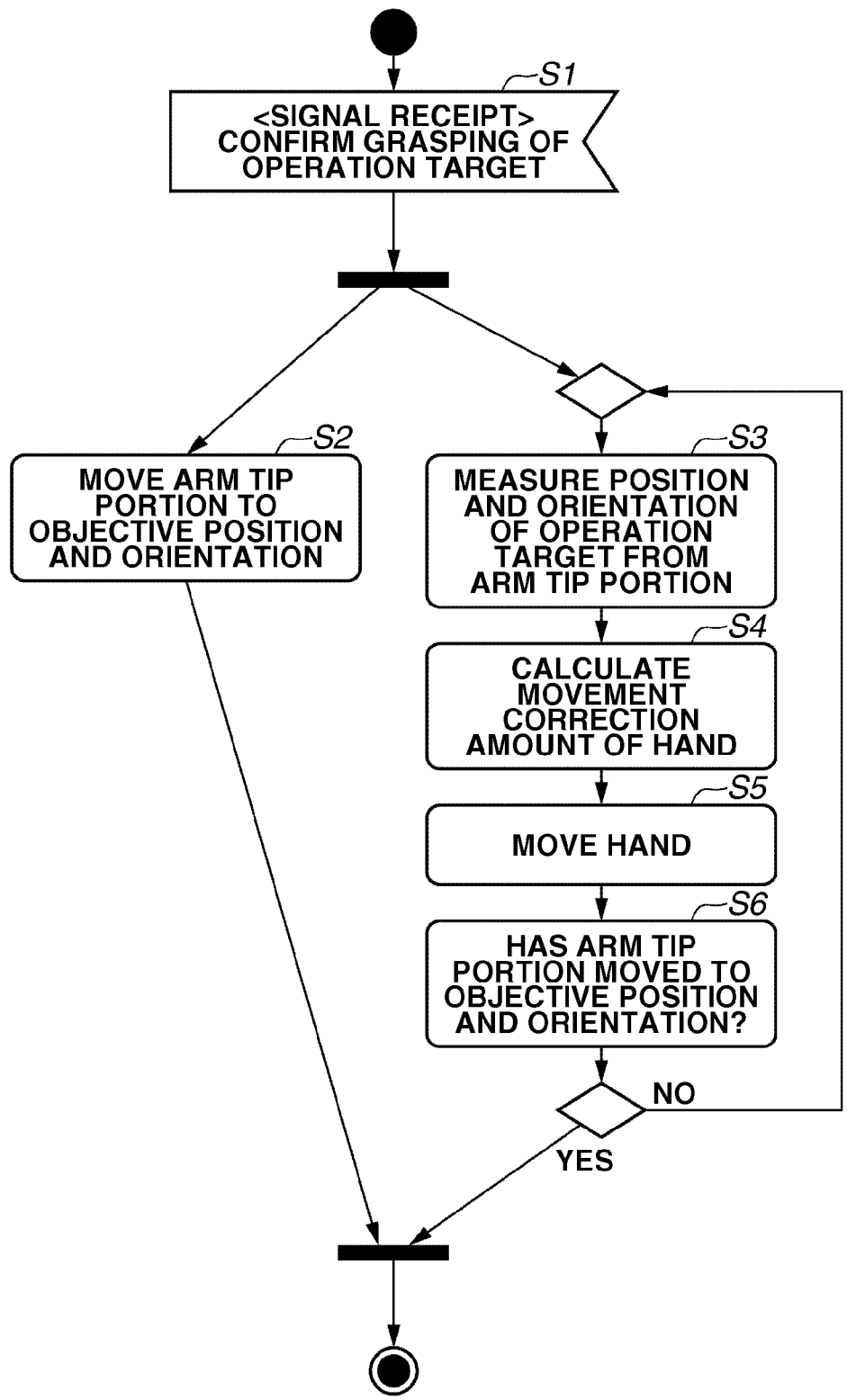
FIG. 4 is a flowchart illustrating a control processing flow according to the second exemplary embodiment.

FIG. 4 is illustrates a control processing flow according to a second exemplary embodiment. The processing performed in steps S1 to S5 is the same as that illustrated in FIG. 2. However, in this case, the position and orientation measured by the position and orientation measurement apparatus 22 are the tip of the flexible protrusion 31 of the operation target 3.

After the processing performed in steps S1 to S5 has finished, the tip of the protrusion 31 may not always be in the correct relative position and orientation. This is because the flexible protrusion 31 may deform under its own weight. Therefore, after step S5 is finished, in step S6, it is confirmed whether the arm tip portion 11 has completed moving to the objective position and orientation PA1. If the arm tip portion 11 is still moving (NO in step S6), measurement (step S3) and correction (step S4) of the position and orientation of the flexible protrusion 31 are again performed, and in step S5, the hand 2 is moved.

By processing in this manner, for example, even if the flexible protrusion 31 is not at the correct relative position and orientation when the arm tip portion 11 movement is completed, that deviation should be slight. Consequently, the position correction of the flexible protrusion 31 after arm movement is made can be completed in a short time.

Figure 5:
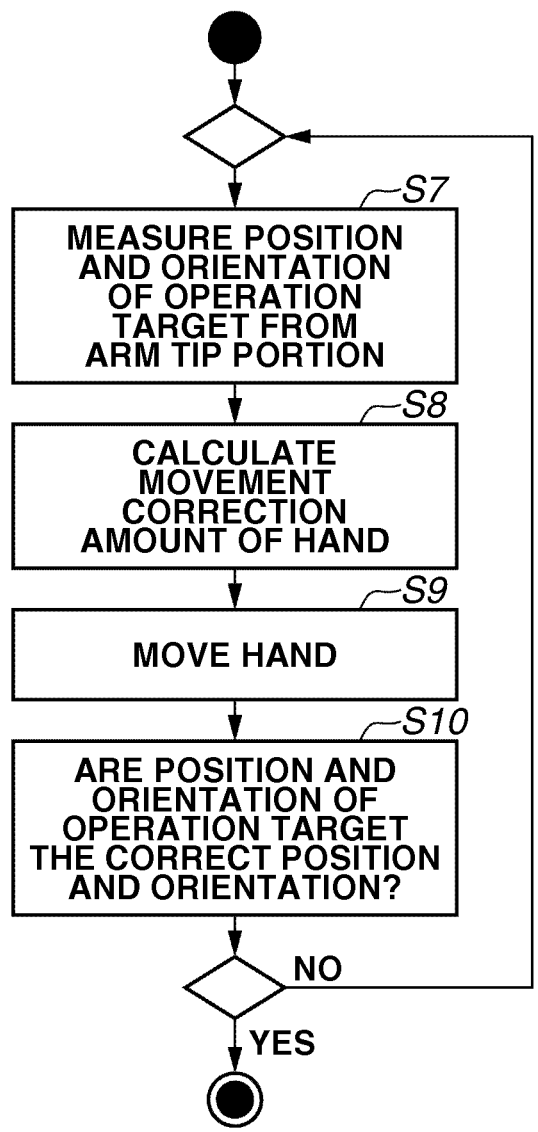
FIG. 5 is a flowchart illustrating a control processing flow when performing positional correction of a protrusion after movement of an arm tip portion has been completed.

FIG. 5 illustrates a control processing flow when performing positional correction of the protrusion 31 after movement of the arm tip portion 11 has been completed. Steps S7 to S9 are the same as in FIG. 4. In step S10, if it is determined that the protrusion 31 is at the correct position and orientation (YES in step S10), the processing is completed. If it is determined that the protrusion 31 is not at the correct position and orientation (NO in step S10), steps S7 to S9 are repeated.

Thus, by repeatedly executing position and orientation measurement and position and orientation correction while the arm tip portion 11 is still moving, appropriate relative position and orientation correction can be performed that follows shape deformation even for assembly of a flexible object that is susceptible to shape change.

In the above exemplary embodiments, another operation target 4 was treated as if it had no deviation from a correct position and orientation. However, like the operation target 3, another operation target 4 may also deviate from the correct position and orientation.

Figure 6:
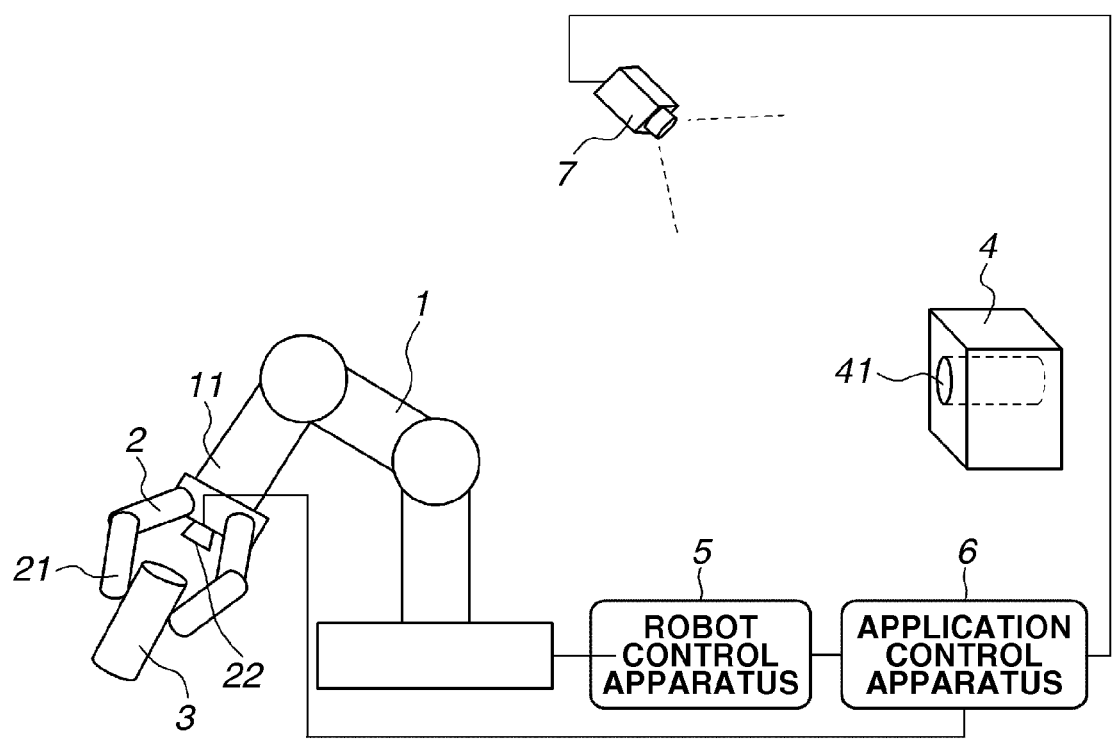
FIG. 6 illustrates a configuration and operational state of a robot system according to a third exemplary embodiment.

Accordingly, an example will be described which gives consideration to deviation of the position and orientation of another operation target 4. FIG. 6 illustrates a configuration example of a robot system according to a third exemplary embodiment. Compared with FIG. 1, another position and orientation measurement apparatus 7 is added. Another position and orientation measurement apparatus 7 measures the position and orientation of another operation target 4, and notifies the application control apparatus 6. Another position and orientation measurement apparatus 7 can be realized by, for example, a visual sensor that uses a camera. The position and orientation measurement method employed by another position and orientation measurement apparatus 7 is not limited, as long as the position and orientation of another operation target 4 can be measured.

Figure 7:
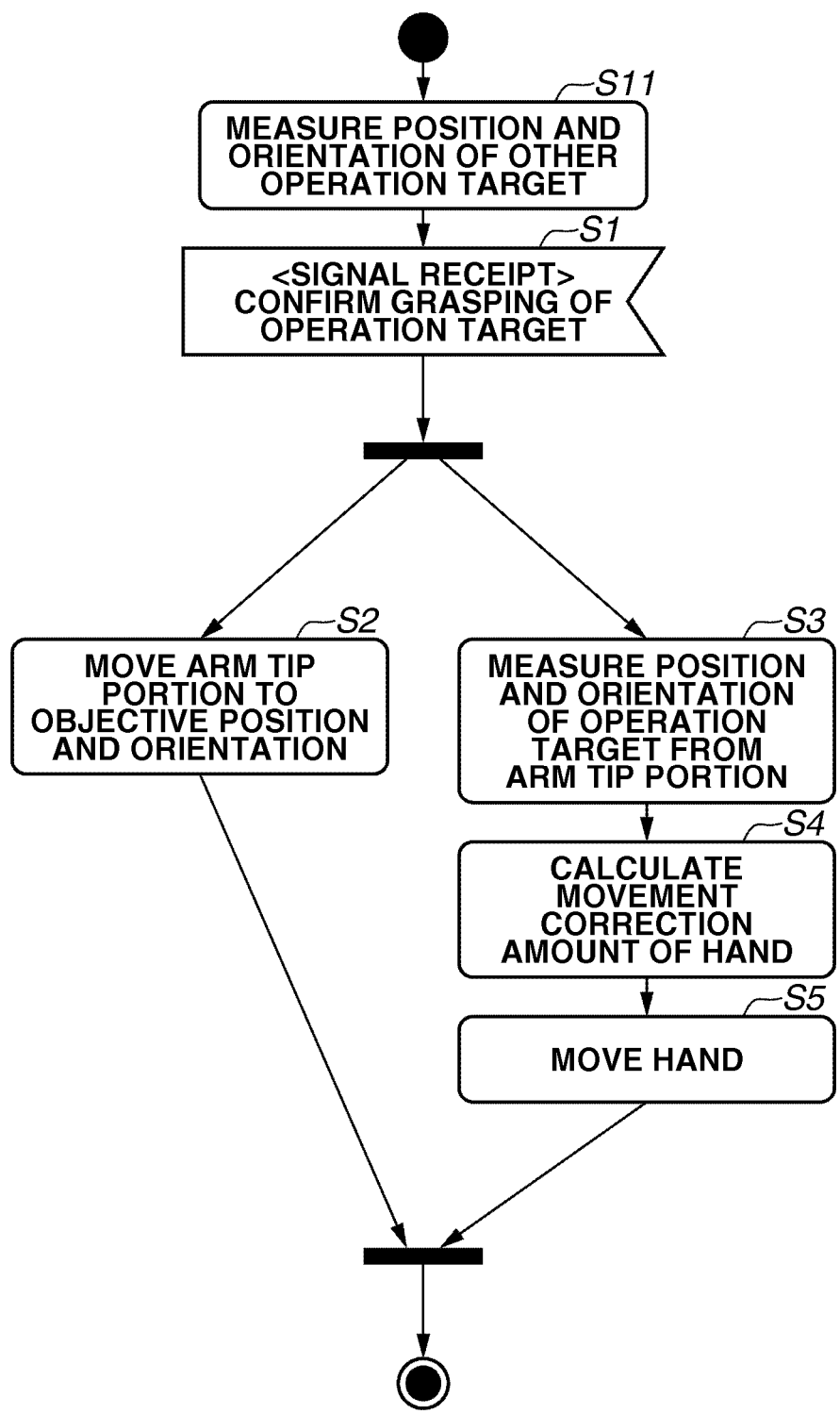
FIG. 7 is a flowchart illustrating a control processing flow according to the third exemplary embodiment.

FIG. 7 illustrates a control processing flow according to a third exemplary embodiment. FIG. 7 is similar to FIG. 2, but has a step S11 for measuring the position and orientation of another operation target 4, which is added before step S1.

This step S11 may be performed at any point, as long as it is before step S4.

In the control processing flow illustrated in FIG. 2, in the movement correction amount calculation of the hand 2 (step S4), the objective position and orientation PH2 of the hand 2 when the operation target 3 is moved to the correct position and orientation PO2 was calculated based on the current position and orientation PH1 of the hand 2 and the position and orientation PO1 of the operation target 3. In the present exemplary embodiment, consideration is also given in step S4 to the position and orientation of another operation target 4.

Specifically, the movement correction amount calculated in step S4 may be further corrected so as to cancel the deviation of another operation target 4 from the correct position and orientation. For example, when the position and orientation PH1 and the position and orientation PH2 are represented by six factors, a translation amount in the XYZ directions and a rotation amount about each axis, the correction amount can be obtained by subtracting PH1 from PH2.

Thus, when performing a fitting or assembly operation on another operation target 4, there is the advantage that the positional deviation of another operation target 4 can be corrected. Further, although the present exemplary embodiment is described based on the first exemplary embodiment, the present exemplary embodiment can also be applied by carrying out similar correction when calculating the movement correction amount of the hand 2 even in step S4 of FIG. 4 and step S8 in FIG. 5 in the second exemplary embodiment.

Depending on the position and orientation of the operation target 3 when grasped by the grasping member 21, the operation target 3 and an obstruction may collide due to the movement of the arm tip portion 11. In such a case, a plurality of movement paths for the arm tip portion 11 may be set in advance, and one of these paths may be selected based on the position and orientation of the operation target 3 grasped by the grasping member 21.

How the path is determined and selected is not especially limited. However, this process can be executed by simulating in advance the positions and orientations of the operation target 3 and the paths that the operation target 3 can move along without colliding with an obstruction, and associating these with each other. Specifically, the movement paths of the arm tip portion 11 along which the arm tip portion 11 can go down without colliding with an obstruction corresponding to the positions and orientations of the operation target 3 are formed into a table, and stored. The movement path of the arm tip portion 11 corresponding to the position and orientation of the operation target 3 is selected by referring during execution to this table that is produced during the simulation.

Figure 8:
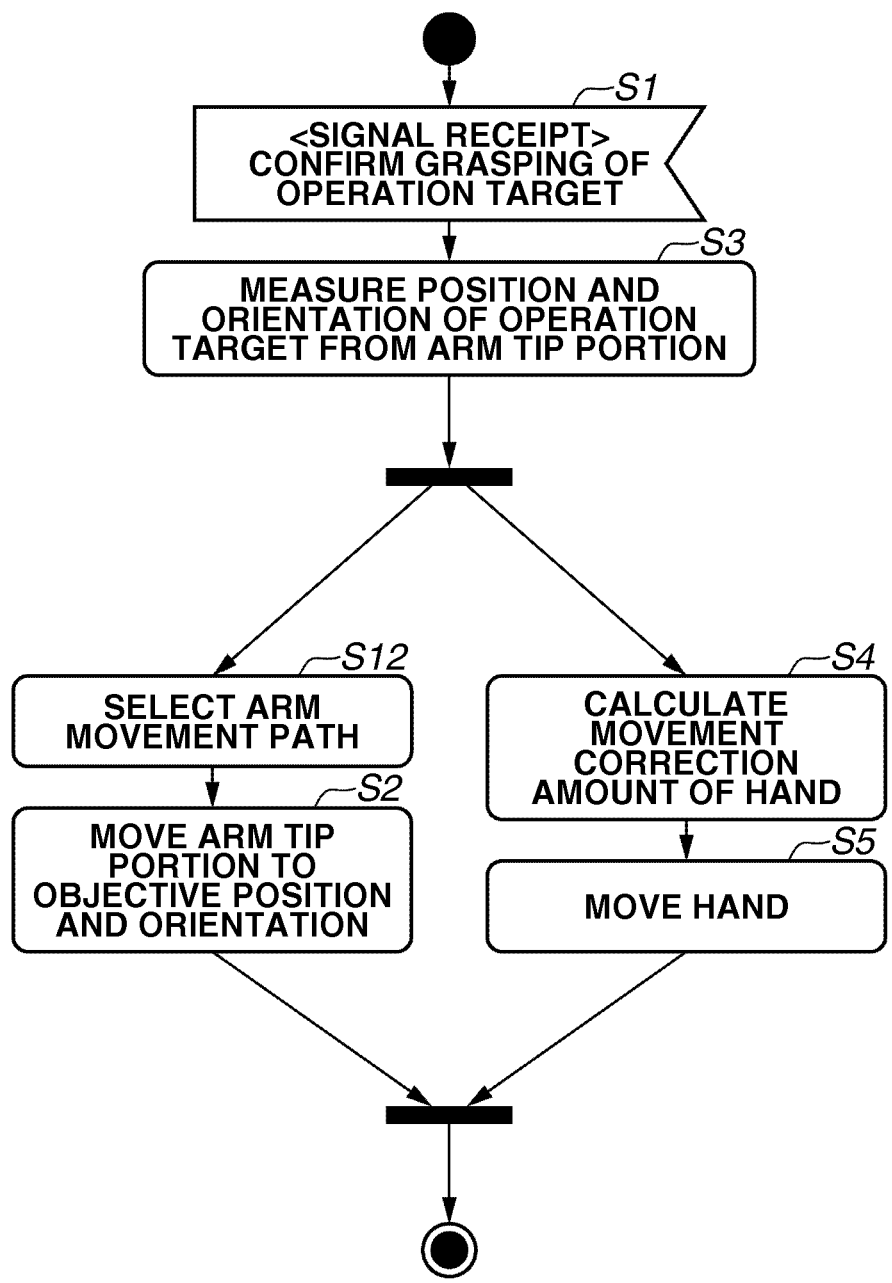
FIG. 8 is a flowchart illustrating a control processing flow according to a fourth exemplary embodiment.

FIG. 8 illustrates a control processing flow according to a fourth exemplary embodiment. The difference with FIG. 2 is that the processing of step S3 is performed before the processing flow branches into two, and that a step S12 for selecting the movement path of the arm tip portion 11 is executed before step S2.

In step S3, the position and orientation from the arm tip portion 11 of the operation target 3 are measured. In this example, the processing flow branches into two. In one branch, movement of the arm tip portion 11 is performed. First, in step S12, the movement path of the arm tip portion 11 from the position and orientation of the operation target 3 measured in step S3 is selected from among the predetermined paths.

Then, in step S2, the arm tip portion 11 is moved along the selected path to the objective position and orientation PA1.

In parallel with the movement of the arm tip portion 11, in the other branch of the processing, position correction of the hand 2 is performed. Similar to the example illustrated in FIG. 2, the position correction is performed by, in step S4, calculating the correction amount of the position and orientation of the hand 2, and then in step S5, moving the hand 2 based on the calculated correction amount.

Thus, when there is a large deviation in the position and orientation of the grasped operation targets, the present exemplary embodiment has the advantage that collisions with another obstruction while the arm tip portion 11 is moving can be avoided, or that the grasping operation does not have to be performed again.

Figure 9:
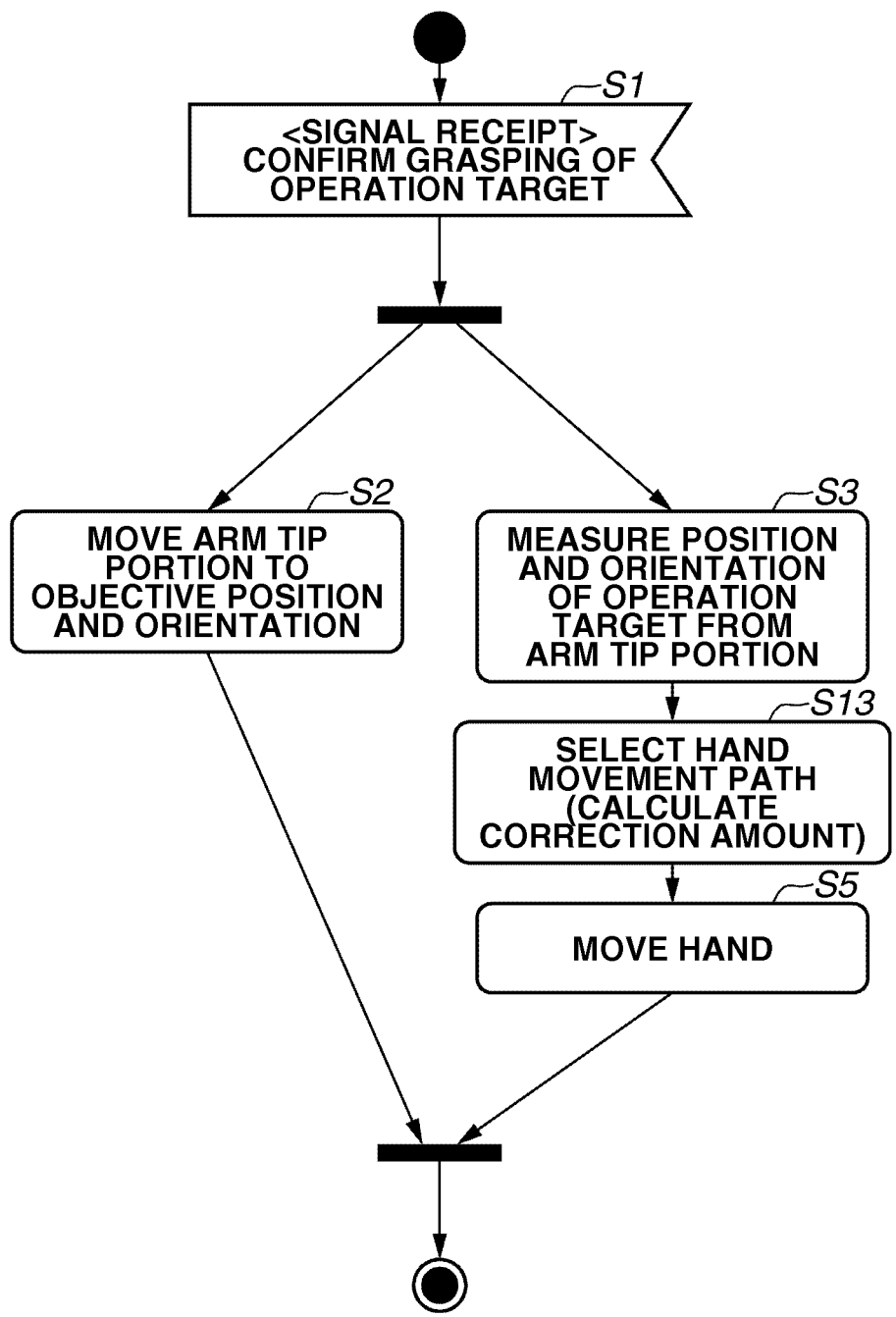
FIG. 9 is a flowchart illustrating a control processing flow according to a fifth exemplary embodiment.

The path selection for obstruction avoidance described in the fourth exemplary embodiment can also be performed by selecting the movement path of the hand 2. FIG. 9 illustrates a control processing flow according to a fifth exemplary embodiment. The difference with FIG. 2 is that step S13 for selecting the movement path of the hand 2 is executed instead of step S4. Similar to the fourth exemplary embodiment, the setting of a preset path can be performed by producing a table based on simulation. Further, path selection can also be performed based on the position and orientation of the operation target 3 by referring to this table.

In the fourth exemplary embodiment, the movement path of the arm tip portion 11 for obstruction avoidance was selected based on the position and orientation of the operation target 3 grasped by the grasping member 21. However, this selection may be performed by also using the position and orientation of another operation target 4 measured by another position and orientation measurement apparatus 7.

Figure 10:
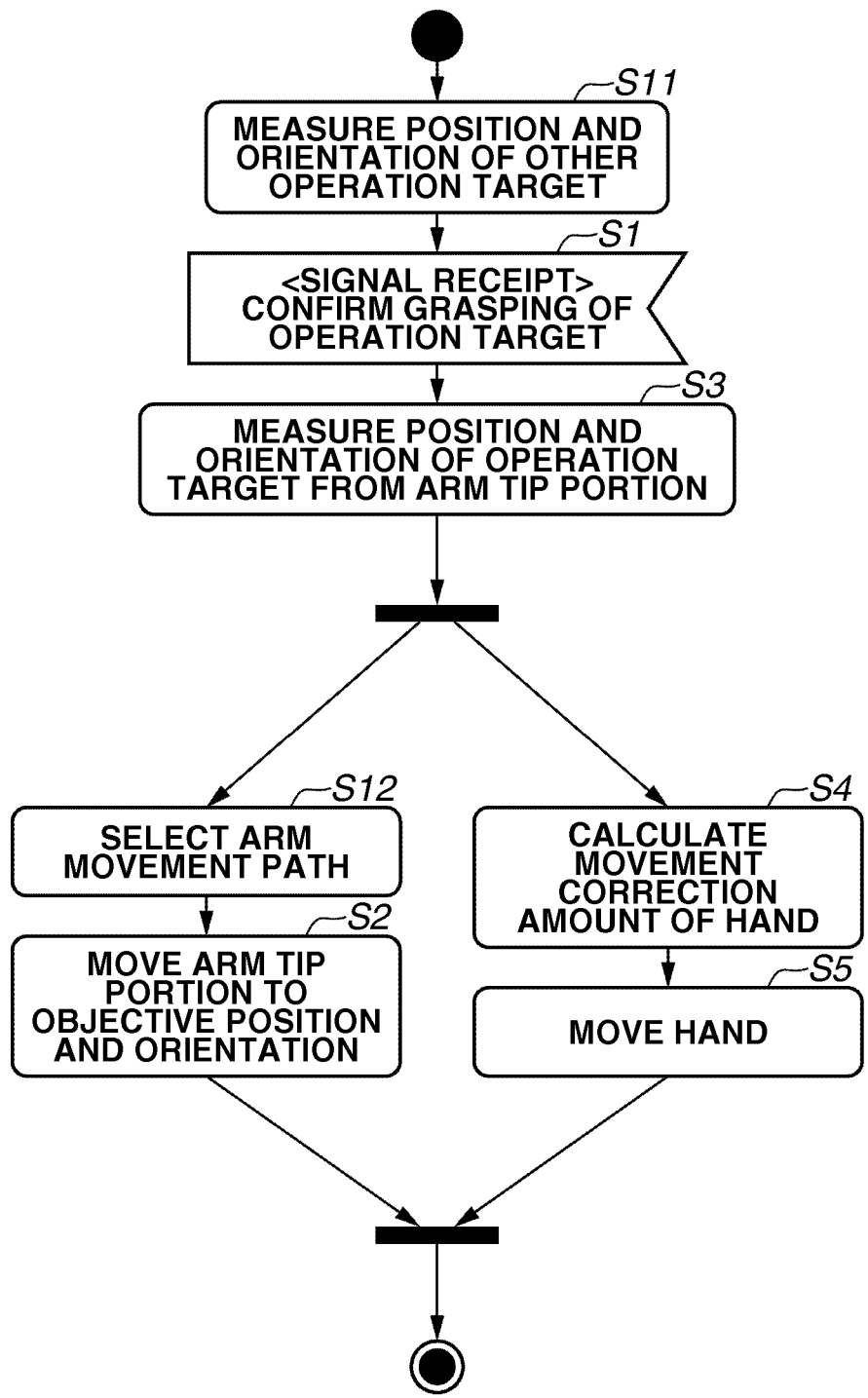
FIG. 10 is a flowchart illustrating a control processing flow according to a sixth exemplary embodiment.

FIG. 10 illustrates a control processing flow according to a sixth exemplary embodiment. The difference with FIG. 8 is that, in step S11, the position and orientation of another operation target 4 is first measured by another position and orientation measurement apparatus 7.

When selecting the movement path of the arm tip portion 11 in step S12, both the relative position and orientation from the arm tip portion 11 of the operation target 3 and the position and orientation in the robot reference coordinate system of another operation target 4 are used. More specifically, for combinations of both of these positions and orientations, the movement paths of the arm tip portion 11 which can avoid an obstruction are drawn up in a table in advance based on simulation. During execution, the movement path of the arm tip portion 11 is selected by referring to this table.

In the fifth exemplary embodiment, the movement path of the hand 2 for obstruction avoidance was selected based on the position and orientation of the operation target 3 grasped by the grasping member 21. However, this selection may also be performed by using the position and orientation of another operation target 4 measured by another position and orientation measurement apparatus 7.

Figure 11:
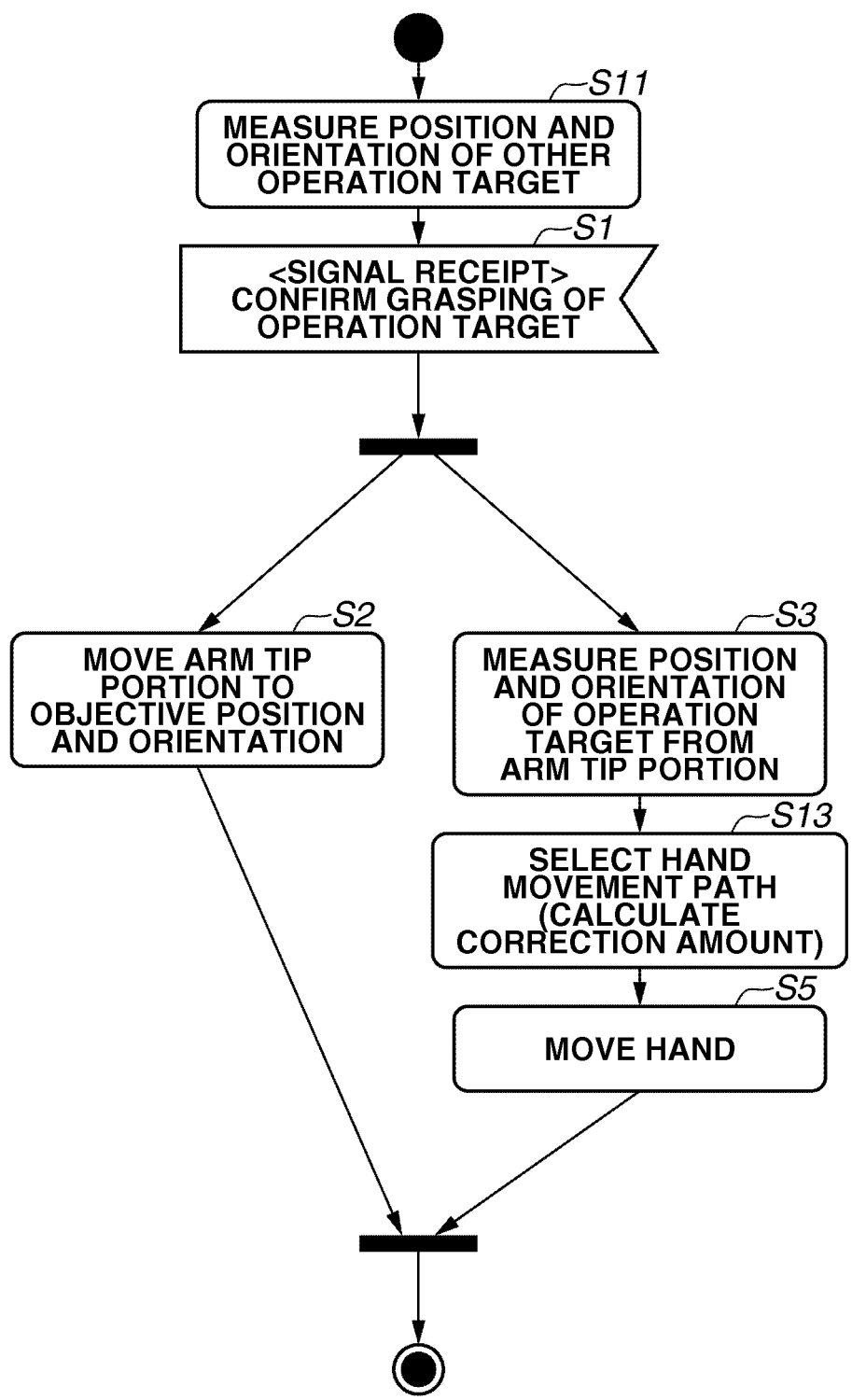
FIG. 11 is a flowchart illustrating a control processing flow according to a seventh exemplary embodiment.

FIG. 11 illustrates a control processing flow according to a seventh exemplary embodiment. The difference with FIG. 9 is that, in step S11, the position and orientation of another operation target 4 is first measured by another position and orientation measurement apparatus 7.

When selecting the movement path of the hand 2 in step S13, both the relative position and orientation from the arm tip portion 11 of the operation target 3 and the position and orientation in the robot reference coordinate system of another operation target 4 are used. As already described above, the movement path of the hand 2 can also be selected by pre-storing the possible movement paths in the form of a table based on simulation.

Figure 12:
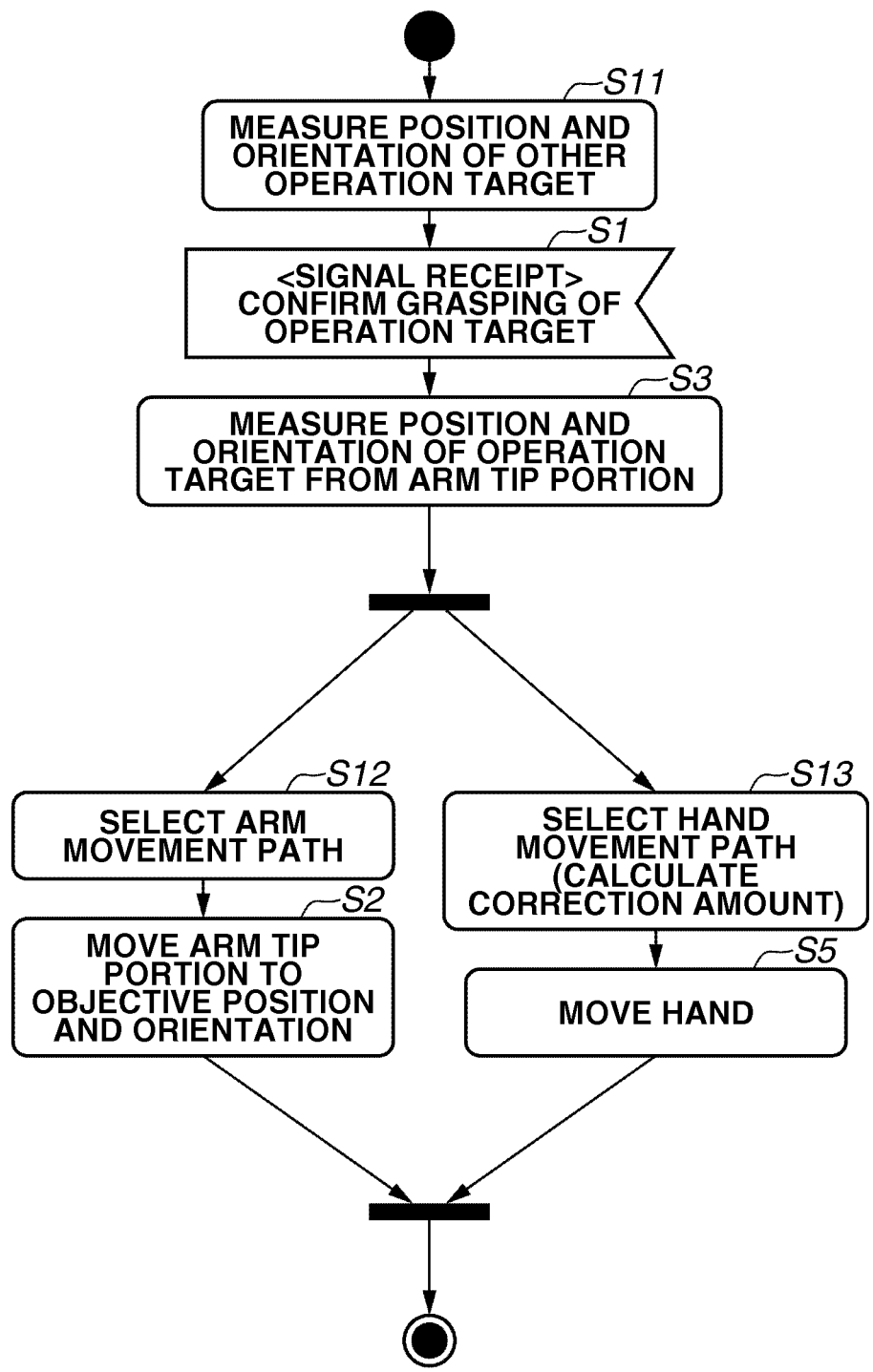
FIG. 12 is a flowchart illustrating a control processing flow according to an eighth exemplary embodiment.

In the fourth to seventh exemplary embodiments, although only one of either the movement path of the arm tip portion 11 or the movement path of the hand 2 was selected, both of these paths may be selected. FIG. 12 illustrates a control processing flow according to an eighth exemplary embodiment which combines the sixth and seventh exemplary embodiments. The difference with FIG. 10 is that step S13 for selecting the movement path of the hand 2 is executed instead of step S4. By selecting the movement paths of both the arm tip portion 11 and the hand 2, the time required for avoidance can sometimes be shorter than when an obstruction is avoided using only one of these movement paths.

As already described, selection of the movement paths of the arm tip portion 11 and the hand 2 can be performed by pre-storing the possible movement paths in the form of a table based on simulation. Further, although the sixth and seventh exemplary embodiments are combined in the present embodiment, an arbitrary combination may be employed, as long as the movement path selections of both the arm tip portion 11 and the hand 2 are used.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-291238 filed Dec. 22, 2009, which is hereby incorporated by reference herein in its entirety.

What is claimed is:

1. A robot system comprising:
at least one processor communicatively-coupled to a memory;
an arm capable of controlling a position and orientation of an arm tip portion;
a holding unit, which is attached to the arm tip portion and which comprises a holding mechanism configured to hold a target object, capable of controlling a relative position and orientation of a first target object held by the holding mechanism to the arm tip portion;
a first position and orientation measurement unit configured to measure the relative position and orientation of the first target object held by the holding unit to the arm tip portion;
a second position and orientation measurement unit configured to measure a second position and orientation of a second target object to be fitted or assembled with the first target object; and
a correction unit configured to correct a position and orientation of the holding unit by controlling the holding unit, without changing controlling amount of the arm based on a result of both the first position and orientation measurement unit and the second position and orientation measurement unit while the arm is still moving after the holding unit holds the first target object.

2. The robot system according to claim 1, wherein the correction unit is configured to complete position and orientation measurement, and position and orientation correction of the first target object before movement of the arm tip portion is completed.

3. The robot system according to claim 1, wherein the correction unit is configured to repeatedly execute position and orientation measurement, and position and orientation correction of the first target object while the arm tip portion is still moving.

4. The robot system according to claim 1, further comprising a selection unit configured to select a movement path of the arm tip portion from among a plurality of predetermined paths based on a result of the first position and orientation measurement unit.

5. The robot system according to claim 1, further comprising a selection unit configured to select, during position and orientation correction of the first target object, a movement path of the first target object from among a plurality of predetermined paths based on a result of the first position and orientation measurement unit.

6. A robot system control apparatus comprising:
at least one processor communicatively-coupled to a memory;
an arm capable of controlling a position and orientation of an arm tip portion;
a holding unit, which is attached to the arm tip portion and which comprises a holding mechanism configured to hold a target object, capable of controlling a relative position and orientation of a first target object held by the holding mechanism to the arm tip portion;
a first position and orientation measurement unit configured to measure the relative position and orientation of the first target object held by the holding unit to the arm tip portion;
a second position and orientation measurement unit configured to measure a second position and orientation of a second target object to be fitted or assembled with the first target object; and
a correction unit configured to correct a position and orientation of the holding unit by controlling the holding unit, without changing controlling amount of the arm based on a result of both the first position and orientation measurement unit and the second position and orientation measurement unit while the arm is still moving after the holding unit holds the first target object.

7. A method for controlling a robot system comprising:
at least one processor communicatively-coupled to a memory;
an arm capable of controlling a position and orientation of an arm tip portion;

a holding unit, which is attached to the arm tip portion and which comprises a holding mechanism configured to hold a target object, capable of controlling a relative position and orientation of a first target object held by the holding mechanism to the arm tip portion;

a first position and orientation measurement unit configured to measure the relative position and orientation of the first target object held by the holding unit to the arm tip portion;

a second position and orientation measurement unit configured to measure a second position and orientation of a second target object to be fitted or assembled with the first target object; and a correction unit configured to correct a position and orientation of the holding unit by controlling the holding unit, without changing controlling amount of the arm based on a result of both the first position and orientation measurement unit and the second position and orientation measurement unit while the arm is still moving after the holding unit holds the first target object.

8. A non-transitory computer-readable medium storing a computer-executable process for controlling a robot system comprising:

at least one processor communicatively-coupled to a memory;

an arm capable of controlling a position and orientation of an arm tip portion;

a holding unit, which is attached to the arm tip portion and which comprises a holding mechanism configured to hold a target object, capable of controlling a relative position and orientation of a first target object held by the holding mechanism to the arm tip portion;

a first position and orientation measurement unit configured to measure the relative position and orientation of the first target object held by the holding unit to the arm tip portion;

a second position and orientation measurement unit configured to measure a second position and orientation of a second target object to be fitted or assembled with the first target object; and a correction unit configured to correct a position and orientation of the holding unit by controlling the holding unit, without changing controlling amount of the arm based on a result of both the first position and orientation measurement unit and the second position and orientation measurement unit while the arm is still moving after the holding unit holds the first target object.

9. The apparatus according to claim 1, wherein the correction unit corrects the position and orientation of the holding unit so that the first target object is fitted or assembled with the second target object.

10. The system according to claim 1, wherein the holding unit is a robot hand.

11. A robot system comprising:

at least one processor communicatively-coupled to a memory;

an arm capable of controlling a position and orientation of an arm tip portion;

a hand, which is attached to the arm tip portion and which comprises a grasping mechanism configured to grasp an operation target, capable of controlling a relative position and orientation of the operation target grasped by the grasping mechanism to the arm tip portion;

a position and orientation measurement unit configured to measure the relative position and orientation of the operation target grasped by the hand to the arm tip portion while the arm tip portion is moving with grasping the operation target;

a correction unit configured to correct the position and orientation of the grasped operation target while the arm tip portion is moving with grasping the operation target; and a second position and orientation measurement unit configured to, when performing a fitting or assembly operation for a grasped operation target on a second operation target, measure the position and orientation of the second operation target, wherein the correction unit is configured to determine the predetermined relative position and orientation using both a result of the position and orientation measurement of the operation target performed by the position and orientation measurement unit, and a result of the position and orientation measurement of the second operation target performed by the second position and orientation measurement unit.

12. A robot system comprising:

at least one processor communicatively-coupled to a memory;

an arm capable of controlling a position and orientation of an arm tip portion;

a hand, which is attached to the arm tip portion and which comprises a grasping mechanism configured to grasp an operation target, capable of controlling a relative position and orientation of the operation target grasped by the grasping mechanism to the arm tip portion;

a position and orientation measurement unit configured to measure the relative position and orientation of the operation target grasped by the hand to the arm tip portion while the arm tip portion is moving with grasping the operation target;

a correction unit configured to correct the position and orientation of the grasped operation target while the arm tip portion is moving with grasping the operation target; and a second position and orientation measurement unit configured to, when performing a fitting or assembly operation for a grasped operation target on a second operation target, measure the position and orientation of the second operation target, wherein the correction unit is configured to select a movement path of the arm tip portion from among a plurality of predetermined paths using a result of position and orientation measurement of the grasped operation target and a result of position and orientation measurement of the second operation target performed by the second position and orientation measurement unit.

13. A robot system comprising:

at least one processor communicatively-coupled to a memory;

an arm capable of controlling a position and orientation of an arm tip portion;

a hand, which is attached to the arm tip portion and which comprises a grasping mechanism configured to grasp an operation target, capable of controlling a relative position and orientation of the operation target grasped by the grasping mechanism to the arm tip portion;

a position and orientation measurement unit configured to measure the relative position and orientation of the operation target grasped by the hand to the arm tip portion while the arm tip portion is moving with grasping the operation target;

a correction unit configured to correct the position and orientation of the grasped operation target while the arm tip portion is moving with grasping the operation target;

a second position and orientation measurement unit configured to, when performing a fitting or assembly operation for the grasped operation target on a second operation target, measure the position and orientation of the second operation target, wherein the correction unit is configured to, during position and orientation correction of the grasped operation target, select a movement path of the operation target from among a plurality of predetermined paths based on both a result of position and orientation measurement of the grasped operation target, and a result of position and orientation measurement of the second operation target performed by the second position and orientation measurement unit.

* * * * *